United States Patent
Hagan et al.

(10) Patent No.: US 10,316,751 B2
(45) Date of Patent: Jun. 11, 2019

(54) SHIELDED PASS THROUGH PASSAGE IN A GAS TURBINE ENGINE STRUCTURE

(71) Applicant: United Technologies Corporation, Hartford, CT (US)

(72) Inventors: Benjamin F. Hagan, Manchester, CT (US); Ryan Alan Waite, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 738 days.

(21) Appl. No.: 14/837,398

(22) Filed: Aug. 27, 2015

(65) Prior Publication Data
US 2016/0061112 A1    Mar. 3, 2016

Related U.S. Application Data

(60) Provisional application No. 62/042,829, filed on Aug. 28, 2014.

(51) Int. Cl.
*F01D 5/14*        (2006.01)
*F01D 5/18*        (2006.01)
(Continued)

(52) U.S. Cl.
CPC .............. *F02C 7/18* (2013.01); *F01D 5/147* (2013.01); *F01D 5/187* (2013.01); *F01D 9/04* (2013.01);
(Continued)

(58) Field of Classification Search
CPC .... F02C 7/18; F02C 3/04; F01D 5/147; F01D 5/18; F01D 5/187; F01D 5/188;
(Continued)

(56) References Cited

U.S. PATENT DOCUMENTS 5,702,232 A * 12/1997 Moore .................... F01D 5/186
                                                                416/95
5,931,638 A    8/1999 Krause et al.
(Continued)

FOREIGN PATENT DOCUMENTS

EP      1074695     7/2001
EP      1921272     5/2008
(Continued)

OTHER PUBLICATIONS

Extended European Search Report for Application No. 15182775.5 dated Feb. 5, 2016.

*Primary Examiner* — Mark A Laurenzi
*Assistant Examiner* — Mickey H France
(74) *Attorney, Agent, or Firm* — Carlson, Gaskey & Olds P.C.

(57) ABSTRACT a gas turbine engine structure includes a body radially spanning an inner portion and an outer portion. The structure body includes a first passage interior to the structure body. The first passage includes a first opening on one of a radially outward edge and a radially inward edge of the structure, and a second opening on the other of the radially outward edge and the radially inward edge of the structure. A second passage is also included interior to the structure. The second passage is approximately aligned with the first passage, and is disposed between the first passage and one of the first surface and the second surface of the structure. The second passage insulates the first passage from heat transfer through one of the first surface and the second surface.

22 Claims, 3 Drawing Sheets

(51) Int. Cl.
  *F01D 9/04* (2006.01)
  *F02C 3/04* (2006.01)
  *F02C 7/18* (2006.01)
(52) U.S. Cl.
  CPC ............ *F02C 3/04* (2013.01); *F05D 2220/32* (2013.01); *F05D 2260/202* (2013.01); *Y02T 50/676* (2013.01)
(58) Field of Classification Search
  CPC .. F01D 9/04; F05D 2220/32; F05D 2260/202; F05D 2260/20; F05D 2260/201; Y02T 50/6764
  USPC .......................................... 416/1, 95; 60/806
  See application file for complete search history.

(56) References Cited

U.S. PATENT DOCUMENTS

| | | | |
|---|---|---|---|
| 6,241,467 B1 | 6/2001 | Zelesky et al. | |
| 2005/0111979 A1 | 5/2005 | Liang | |
| 2005/0175444 A1 | 8/2005 | Liang | |
| 2010/0104419 A1 | 4/2010 | Liang | |
| 2013/0081408 A1* | 4/2013 | Molter | F01D 5/187 60/806 |

FOREIGN PATENT DOCUMENTS

| | | |
|---|---|---|
| EP | 2894301 | 7/2015 |
| WO | 20030042503 | 5/2003 |

* cited by examiner

SHIELDED PASS THROUGH PASSAGE IN A GAS TURBINE ENGINE STRUCTURE

CROSS-REFERENCE TO RELATED APPLICATION

This application claims priority to U.S. Provisional Application No. 62/042,829 filed on Aug. 28, 2014.

STATEMENT REGARDING FEDERALLY SPONSORED RESEARCH OR DEVELOPMENT

This invention was made with government support under Contract No. FA8650-09-D-2923-0021, awarded by the United States Air Force. The Government therefore has certain rights in this invention.

TECHNICAL FIELD

The present disclosure relates generally to airfoil structures for a gas turbine engine, and more specifically to a shielded pass through passage in a turbine structure.

BACKGROUND

Gas turbine engines, such as those utilized in military and commercial aircraft, include a compressor section that compresses air from an inlet and provides the compressed air to a combustor. The combustor mixes the compressed air with a fuel and ignites the mixture. The resultant gasses from the ignition are expelled into a turbine section, and expansion of the gasses through the turbine section causes the turbine section to rotate.

Each of the compressor, combustor and turbine sections are fluidly connected by a primary flow path through which air and combustion gasses travel axially through the engine. Airflow characteristics through the flow path are generally controlled via static vanes and other engine structures mounted in the flow path. The vanes and other structures are disposed circumferentially about the engine.

Gas turbine engines of the above described type frequently include cooling systems that require the transmission of cooling air, or other coolants, from one section of the gas turbine engine to another. When this transmission is required to pass through the core flow path, the coolant is passed through a pass through passage in a vane or other static structure. When the fluid in the core flow path at the static structure containing the pass through is excessively hot, heat can transfer through the vane or other static structure into the coolant passing through the pass through passage. This heat transfer can require the coolant to be overcooled prior to being passed through the vane or other static structure in order to ensure that the coolant being provided on the other side of the flow path is not too hot. Alternatively, other mitigation means are used to ensure that the coolant entering the vane or other static structure is sufficiently cool that any heat picked up by the coolant while passing through the vane or other static structure does not render the coolant too hot.

SUMMARY OF THE INVENTION

In one exemplary embodiment, a gas turbine engine structure includes a structure body spanning a radially inner portion and a radially outer portion, the structure body having a leading edge, a trailing edge, a first surface connecting the leading edge to the trailing edge, and a second surface connecting the leading edge to the trailing edge, a first passage interior to the structure body wherein the first passage includes a first opening on one of a radially outward edge and a radially inward edge and a second opening on the other of the radially outward edge and the radially inward edge, a second passage interior to the structure body, wherein the second passage is approximately aligned with the first passage, and wherein the second passage is disposed between the first passage and one of the first surface and the second surface, and wherein the second passage insulates the first passage from heat transfer through the one of the first surface and the second surface.

Another exemplary embodiment of the above described gas turbine engine structure includes, a third passage interior to the structure body, wherein the third passage is approximately aligned with the first passage, and wherein the third passage is disposed between the first passage and the other of the first surface and the second surface such that the third passage insulates the first passage from heat transfer through the other of the first surface and the second surface.

In another exemplary embodiment of any of the above gas turbine engine structures, the second passage and the third passage are cooling passages, and wherein the second passage and the third passage are connected to a single coolant source.

In another exemplary embodiment of any of the above gas turbine engine structures, the first opening of the first passage is connected to a coolant source, and wherein the second opening of the first passage is connected to a plenum, and wherein the plenum provides a coolant flow to the second passage.

In another exemplary embodiment of any of the above gas turbine engine structures, the plenum further includes a fluid outlet operable to outlet a portion of fluid in the coolant in the first passage to another engine system.

In another exemplary embodiment of any of the above gas turbine engine structures, the second passage is a convective cooling passage.

In another exemplary embodiment of any of the above gas turbine engine structures, wherein the second passage further comprises a plurality of holes connecting the second passage to the one of the pressure surface and the suction surface, thereby providing a film cooling effect to the one of the first surface and the second surface.

In another exemplary embodiment of any of the above gas turbine engine structures, the first passage is a pass through passage, and further comprising a fourth passage, the fourth passage being connected to at least the second passage via a plenum in one of the radially inner portion and the radially outer portion, and wherein the radially inner portion is a radially inner platform and the radially outer portion is a radially outer platform.

In another exemplary embodiment of any of the above gas turbine engine structures, the plenum is positioned in the radially inner portion.

In another exemplary embodiment of any of the above gas turbine engine structures, the structure body has an airfoil shaped profile normal to a chord line, and wherein the first surface is a pressure surface and the second surface is a suction surface.

In another exemplary embodiment, a gas turbine engine includes a compressor section, a combustor section fluidly connected to the compressor section via a flow path, a turbine section fluidly connected to the combustor section via the flow path, at least one gas turbine engine structure extending radially through the flow path and comprising a structure body spanning a radially inner portion and a radially outer portion, the structure body having an upstream edge, a downstream edge, a first surface connecting the upstream edge to the downstream edge, and a second surface connecting the upstream edge to the downstream edge, the at least one gas turbine engine structure including a pass through passage having a fluid inlet on one of a radially outward side of the flow path and a radially inward side of the flow path and an outlet on the other of the radially outward side of the flow path and the radially inward side of the flow path, and a first cooling passage interior to the structure body, wherein the first cooling passage is approximately aligned with the pass through passage, and wherein the first cooling passage is disposed between the pass through passage and one of the first surface and the second surface, and wherein the first cooling passage insulates the pass through passage from heat transfer through the one of the first surface and the second surface.

Another exemplary embodiment of the above described gas turbine engine includes a second cooling passage interior to the structure body, wherein the second cooling passage is approximately aligned with the pass through passage, and wherein the second cooling passage is disposed between the pass through passage and the other of the first surface and the second surface, and wherein the second cooling passage insulates the pass through passage from heat transfer through the other of the first surface and the second surface.

In another exemplary embodiment of any of the above gas turbine engines, the first cooling passage includes a plurality of holes connecting the cooling passage to the one of the first surface and the second surface, such that the first cooling passage is operable to film cool the structure body.

In another exemplary embodiment of any of the above gas turbine engines, the first cooling passage is operable to convectively cool the one of the first surface and the second surface.

In another exemplary embodiment of any of the above gas turbine engines, the first cooling passage includes an outlet connected to one of the radially inner portion and the radially outer portion, such that at least a portion of fluid flowing through the first cooling passage is operable to cool the one of the radially inner portion and the radially outer portion, and wherein the radially outer portion is a radially outer platform and wherein the radially inner portion is a radially inner platform.

In another exemplary embodiment of any of the above gas turbine engines, an inlet of the first cooling passage is connected to an outlet of the pass through passage via a plenum in one of the radially inner portion and the radially outer portion such that a portion of a fluid passing through the pass through passage is provided to the first cooling channel as a coolant.

In another exemplary embodiment of any of the above gas turbine engines, the plenum is defined partially by a void in the one of the radially inner portion and the radially outer portion and partially by an adjacent gas turbine engine component.

In another exemplary embodiment of any of the above gas turbine engines, the at least one gas turbine engine structure including further includes a serpentine coolant passage operable to provide coolant from a source outside the gas turbine engine structure to at least the first cooling passage.

An exemplary method for passing a fluid through a flow path in a gas turbine engine includes passing a fluid through a pass through passage in an engine structure, and insulating the pass through passage from heat in the flow path using at least one cooling passage disposed between the pass through passage and at least one of a first surface and a second surface of the static structure.

Another example of the above described exemplary method for passing a fluid flow through a flow path in a gas turbine engine further includes providing coolant from the cooling passage to at least one of a first platform radially inward of the flow path and a second platform radially outward of the flowpath, thereby providing cooling to the at least one of the platforms.

These and other features of the present invention can be best understood from the following specification and drawings, the following of which is a brief description.

DETAILED DESCRIPTION OF AN EMBODIMENT

Figure 1:
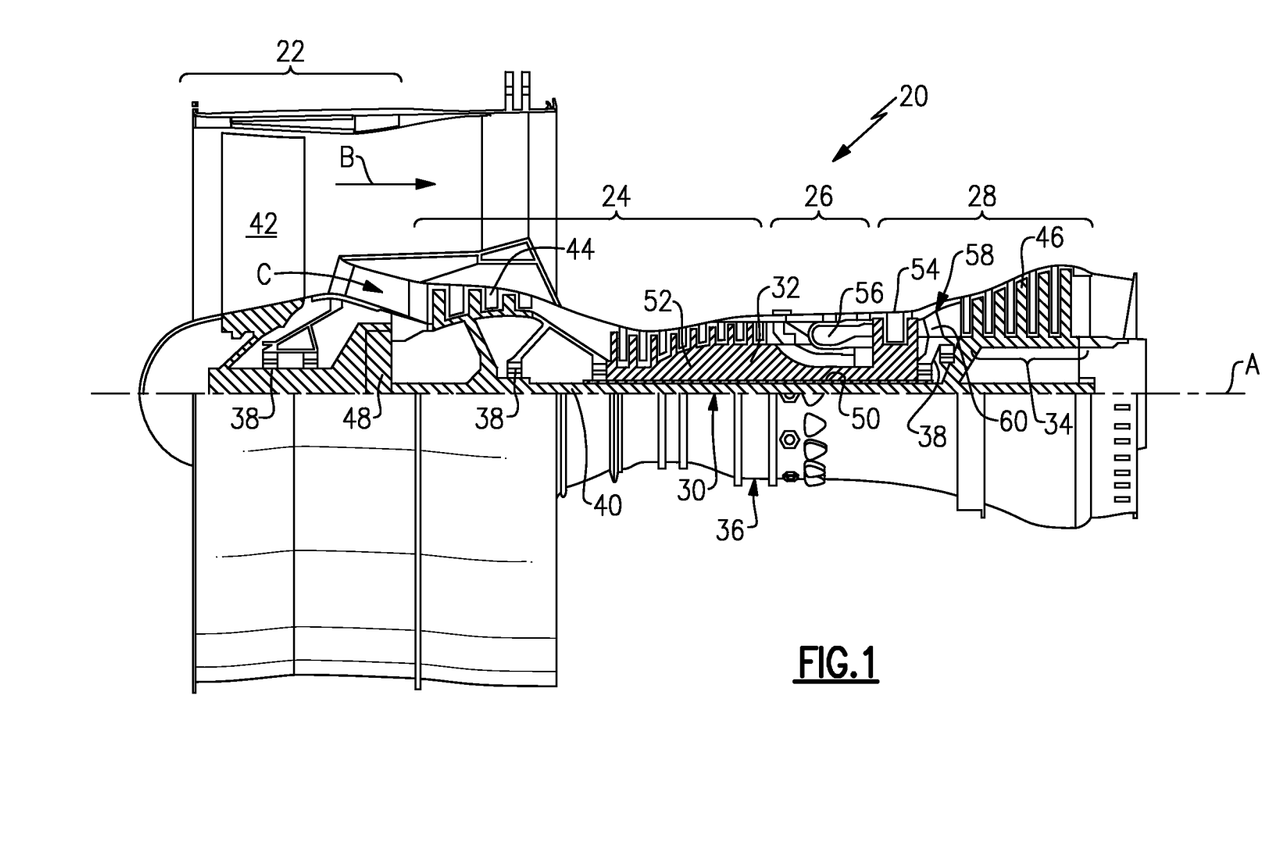
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

The above described geared turbofan engine 20 is exemplary of the typical operation and structure of one type of turbine engine. One of skill in the art, having the benefit of this disclosure, will understand that the structures discussed below can be utilized in turbine engine configurations of any type, including direct drive turbines, and is not limited to geared turbofan configurations. Furthermore, it will similarly be understood by one of skill in the art that the disclosed structure can be applied to other rotating machines including, but not limited to, land based turbines.

Figure 2A:
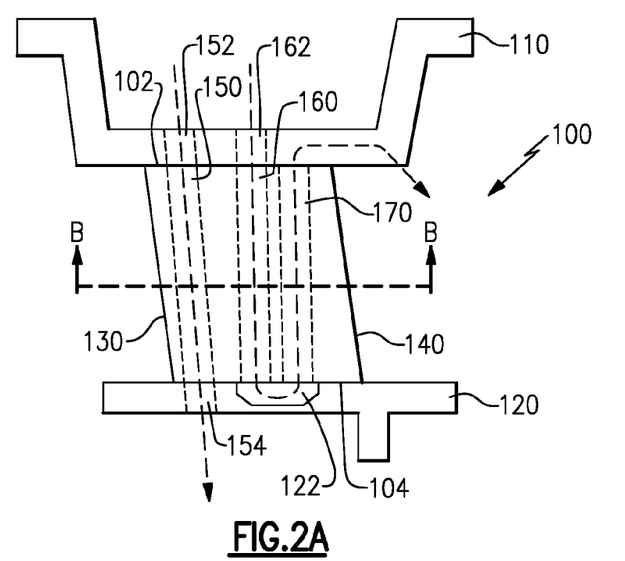
FIG. 2A schematically illustrates a side view of a gas turbine engine structure mounted between two platforms.

FIG. 2A illustrates a static structure 100, such as a vane, that radially spans the core flow path of a gas turbine engine, such as the engine 20 of FIG. 1. The static structure 100 is mounted between an outer diameter platform 110 and an inner diameter platform 120. The static structure 100 has an airfoil shaped profile (illustrated in FIG. 2B) having a leading edge 130 and a trailing edge 140. In some examples, the airfoil shaped profile is designed to affect flow characteristics in the flow path in a specific manner. In other examples, the airfoil shaped profile is designed to minimize the impact that the static structure 100 has on the flow characteristics in the flow path. In alternate examples, the static structure 100 can be a strut, a cylinder, or any other non-airfoil shape. In a non-airfoil shape, an upstream or surface is analogous to the leading edge, and a downstream edge or surface is analogous to the trailing edge. The static structure 100 extends radially outward from the inner diameter platform 120 to the outer diameter platform 110 along a chord line. Included within the static structure 100 is a first passage 150. The first passage 150 is aligned with, and connected to, a corresponding outer diameter passage 152, in the outer diameter platform 110, and a corresponding inner diameter passage 154, in the inner diameter platform 120. The first passage 150 operates as a pass through passage allowing a coolant, or other fluid, to pass through the static structure 100, and thus through the flow path of the engine 20, without impacting on the fluid flow in the flow path.

Also included in the static structure 100 is a second passage 160 that receives a coolant used to cool the static structure 100 from a corresponding passage 162 in the outer diameter platform 110. The second passage 160 extends radially inward to a plenum 122 in the inner diameter platform 120. In, some examples the plenum 122 is defined entirely in the inner platform 120, while in other examples, the plenum is defined by the inner platform 120 and at least one other adjacent structure, such as a cover plate.

A coolant, such as air, entering the second passage 160 through the corresponding passage 162 in the outer diameter platform 110 passes through the second passage 160 into the plenum 122 and is distributed into one or more cooling passages 170. The cooling passages 170 return the coolant to the outer diameter platform 110. The radially inward, then radially outward direction of coolant flow through the second passage 160 and the cooling passages 170 is referred to as a serpentine coolant flow. As the coolant passes through the cooling passages 170, heat at the exterior surfaces 180, 190 of the static structure 100 is transferred to the coolant and the exterior surfaces 180, 190 of the static structure 100 are cooled. Heat transfer through the surface of the structure 100 into the cooling passages 170 is referred to as convective cooling.

In some examples, the returned coolant is passed through the outer diameter platform 110 and output into the flow path. In these examples, the returned coolant provides a cooling effect to the outer diameter platform 110 as well as to the static structure. In alternative examples, the returned coolant can be output directly into the flow path without being used to cool the outer diameter platform 110. In yet further alternative examples, the coolant can be expelled from the engine or provided to another engine system for further use instead of being output into the flow path.

Figure 2B:
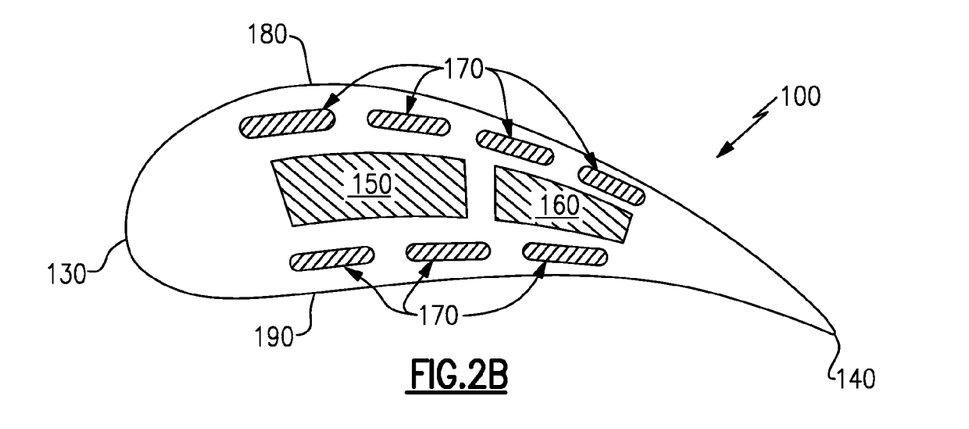
FIG. 2B schematically illustrates a cross section of an example gas turbine engine structure of FIG. 2A along view line B-B.

FIG. 2B illustrates a cross section of the static structure 100 illustrated in FIG. 2A, viewed along view line B-B. The airfoil shaped profile of the static structure 100 includes a suction surface 180 extending from the leading edge 130 to the trailing edge 140 and a pressure surface 190 extending from the trailing edge 130 to the leading edge 140. The first passage 150 extends through the center of the airfoil profile. In some examples the first passage 150 is approximately equidistant from the pressure surface 190 and the suction surface 180. In other examples, the first passage 150 can be closer to one of the pressure surface 190 or the suction surface 180 than the other surface 180, 190

Also passing through the center of the airfoil shaped profile is the second passage 160. The coolant passing through the second passage 160 has a minimal cooling effect on the static structure 100 until it enters the cooling passages 170. The multiple cooling passages 170 are positioned along each of the suction side 180 and the pressure side 190. As described above, the cooling passages 170 provide convective cooling to the exterior of the static structure 100. In addition to the convective cooling, the cooling channels 170 provide an insulative effect to the interior portions of the static structure 100. By positioning the cooling channels 170 between the first passage 150 (the pass through channel) and the exterior surfaces 180, 190, the cooling channels 170 insulate the first passage 150. The insulative effect reduces the impact of the flow path temperature on a fluid passing through the first passage of 150.

In alternate examples, where only one side 180, 190 of the static structure 100 is exposed to excessive heat, or the heat enters the static structure through one side 180, 190, the cooling channels 170 can be positioned along only one side of the structure 100.

Figure 3A:
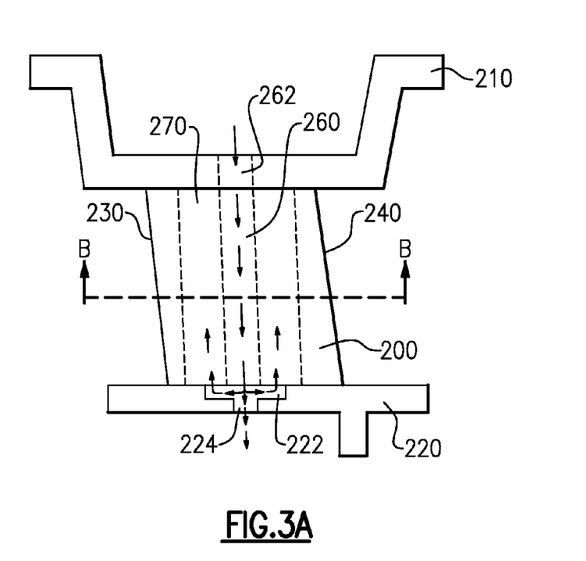
FIG. 3A schematically illustrates a side view of a gas turbine engine structure mounted between two platforms.
Figure 3B:
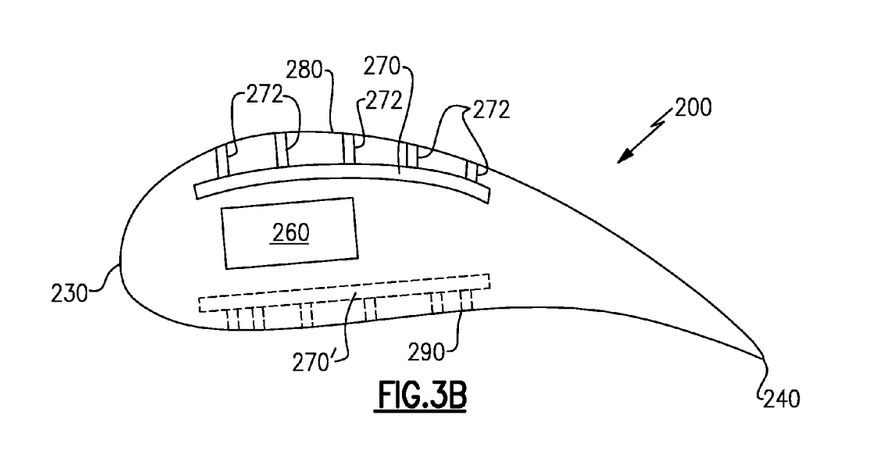
FIG. 3B schematically illustrates a cross section of an example gas turbine engine structure of FIG. 3A along view line B-B.

Referring now to FIGS. 3A and 3B, FIG. 3A illustrates an alternative static structure 200, such as a vane, that radially spans a flow path such as the core flow path C of FIG. 1. As with the example of FIGS. 2A and 2B, the static structure 200 is mounted between an outer diameter platform 210 and an inner diameter platform 220. The static structure 200 has an airfoil shaped profile (illustrated in FIG. 3B) having a leading edge 230 and a trailing edge 240. The static structure 200 extends radially outward from the inner diameter platform 220 to the outer diameter platform 210 along a chord line. Included within the static structure 200 is a combined passage 260. The combined passage 260 is aligned with, and connected to, a corresponding outer diameter passage 252 in the outer diameter platform and a corresponding inner diameter passage 254 in the inner diameter platform. The combined passage 260 operates partially as a pass through passage allowing a coolant, or other fluid, to pass through the static structure 200, and thus through the core flow path, without impacting on the fluid flow in the core flow path.

In contrast to the example of FIG. 2A, the example static structure 200 of FIG. 3A includes a single passage (the combined passage 260) that operates as a combination of the first and second passages 150, 160 of FIG. 2A. In the example of FIG. 3A, a coolant, such as bleed air, enters the combined passage 260 through a corresponding passage 282 in the outer diameter platform 210. The fluid is passed through the static structure 200 into a plenum 222 in the inner diameter platform 220. Once in the plenum 222, the cooling fluid is returned to the outer diameter platform 210 through a cooling passage 270.

The plenum 222 also includes a pass through outlet 224 that distributes a portion of the cooling fluid from the plenum 222 to at least one system radially inward of the flow path. In one example, the pass through outlet 224 includes a controlled valve operable to control an amount of coolant passed through to the radially inward engine systems. The controlled valve can be controlled using a local controller, a remote controller, or any other known control scheme. In an alternate example, the control valve is a passive system and the flow is augmented based on one or more engine parameters that alter the control valve structure as the one or more engine parameters change.

In an alternate example, the pass through outlet 224 is sized and shaped to meter the amount of fluid allowed to pass through at any given time. The metering provides a limit on the amount of fluid passing through to the radially inward engine systems through the pass through outlet 224.

FIG. 3B illustrates a cross sectional view of the static structure 200 of FIG. 3A viewed along view line B-B. As described above, the airfoil shaped profile includes a suction surface 280 extending from the leading edge 230 to the trailing edge 240 and a pressure surface 290 extending from the trailing edge 230 to the leading edge 240. The combined passage 260 extends through the center of the airfoil profile. In the illustrated example, the combined passage 260 is approximately equidistant from the pressure side 290 and the suction side 280. In alternate examples, the combined passage 260 can be closer to one side 280, 290 or the other side 280, 290. Due to the use of a combined passage 260 in place of the first and second passages 150, 160 of FIGS. 2A and 2B, the example configuration of FIGS. 3A and 3B is ideally suited for a system where the fluid being passed through the static structure 200 and the coolant being used to cool the static structure 200 are the same fluid. In some examples, this fluid is a bleed air bled from another system, such as a compressor stage, within the gas turbine engine 20.

In further contrast to the example illustrated in FIG. 2B, the example of FIGS. 3A and 3B includes a single cooling passage 270 extending radially outward along the suction side 280. In some alternate configurations, the structure 200 can include a second optional cooling passage 270'. In the alternate configurations, the optional cooling passage 270's and the cooling passage 270 are both fed from the plenum 222 in the inner diameter platform 220.

In further contrast to cooling passages 170 of FIG. 2B, the cooling passage 270 includes multiple holes 272 connecting the cooling passage 270 to the suction surface 280. A portion of the cooling fluid passing through the cooling passage 270 is expelled through the holes 272 providing a film cooling effect to the static structure 200. In examples including the optional second cooling passage 270', the second cooling passage 270' includes holes 272' connecting the cooling passage 270' to the pressure side 290. The holes 272' provide the above described film cooling affect.

By positioning the cooling passage 270 between the combined passage 260 and the suction surface 280, the cooling passage 270 provides an insulative barrier and prevents heat at the suction side 280 from being passed through to the coolant in the combined passage 260.

As with the example of FIGS. 2A and 2B, the coolant passing through the cooling passages 270, 270' can be passed through the outer diameter platform 210 and cool the outer diameter platform, or be provided to another engine system without passing through the outer diameter platform.

Referring now to the examples of FIGS. 2A, 2B, 3A, and 3B, one of skill in the art having the benefit of this disclosure will understand that the multiple distinct cooling flow paths of FIGS. 2A, 2B and the single cooling flow path 270 per side of FIGS. 3A and 3B can be interchanged and combined with either the combined passage 260 of FIGS. 3A and 3B or the first and second passages 150, 160 of FIGS. 2A and 2B. Further, the single cooling passage 270 of FIG. 3B can be modified to omit the holes 272 and cooling the corresponding structure surface 280, 290 using convective cooling. Similarly, the cooling passages of FIG. 2B can be modified to include film cooling holes, such as the cooling holes 272 of FIG. 3B, and cooling the corresponding surface 180, 190 using film cooling.

Each of the above examples is described with regards to the passages within a single static structure 100, 200. One of skill in the art, having the benefit of this disclosure, will understand that the above considerations can be adapted to operate in a group of static structures, such as a vane pack, with a single serpentine cooling passage passing through each static structure in the pack. In such an example, a pass through passage is included in one or more of the static structures in the pack, and a serpentine cooling flow path runs through all the structures in the pack. As with the above examples, the pass through passage is insulated from heat in the flow path by the positioning of the cooling passage between the pass through passage and at least one side of the static structure. Further, one of skill in the art will understand that the structure 100, 200 is not limited to a vane, but can be any structure spanning the flow path of a turbine engine including, but not limited to, vanes, blade outer air seals, blades and the like.

While the above examples are described generally with regards to passing a coolant through the static structure with the coolant originating a the outer diameter edge of the static structure, one of skill in the art having the benefit of this disclosure will understand that the orientation could be reversed, with the coolant flow originating from the inner diameter. Furthermore, one of skill in the art having the benefit of this disclosure will understand that the passthrough coolant and the static structure coolant can originate on the same edge of the static structure or on opposite edges of the static structure and still fall within the above disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine structure comprising:
   a structure body spanning a radially inner portion and a radially outer portion, the structure body having a leading edge, a trailing edge, a first surface connecting the leading edge to the trailing edge, and a second surface connecting the leading edge to the trailing edge;
   a first passage interior to said structure body wherein said first passage includes a first opening on one of a radially outward edge and a radially inward edge and a second opening on the other of said radially outward edge and said radially inward edge;
   a second passage interior to said structure body, wherein said second passage is approximately aligned with said first passage, and wherein said second passage is disposed between said first passage and one of said first surface and said second surface, and wherein said second passage insulates said first passage from heat transfer through said one of said first surface and said second surface; and
   wherein the first opening is an opening at a radially outward facing edge of a radially outer platform, and wherein the second opening is an opening at a radially inward facing edge of a radially inner platform.

2. The gas turbine engine structure of claim 1, further comprising a third passage interior to said structure body, wherein said third passage is approximately aligned with said first passage, and wherein said third passage is disposed between said first passage and the other of said first surface and said second surface such that said third passage insulates said first passage from heat transfer through said other of said first surface and said second surface.

3. The gas turbine engine structure of claim 2, wherein said second passage and said third passage are cooling passages, and wherein said second passage and said third passage are connected to a single coolant source.

4. The gas turbine engine structure of claim 1, wherein said first opening of said first passage is connected to a coolant source, and wherein the second opening of said first passage is connected to a plenum, and wherein said plenum provides a coolant flow to said second passage.

5. The gas turbine engine structure of claim 4, wherein said plenum further includes a fluid outlet operable to outlet a portion of fluid in said coolant in said first passage to another engine system.

6. The gas turbine engine structure of claim 1, wherein said second passage is a convective cooling passage.

7. The gas turbine engine structure of claim 1, wherein said second passage further comprises a plurality of holes connecting said second passage to said one of said pressure surface and said suction surface, thereby providing a film cooling effect to said one of said first surface and said second surface.

8. The gas turbine engine structure of claim 1, wherein said first passage is a pass through passage, and further comprising a fourth passage, the fourth passage being connected to at least said second passage via a plenum in one of said radially inner portion and said radially outer portion, and wherein said radially inner portion is a radially inner platform and said radially outer portion is a radially outer platform.

9. A gas turbine engine structure comprising:
   a structure body spanning a radially inner portion and a radially outer portion, the structure body having a leading edge, a trailing edge, a first surface connecting the leading edge to the trailing edge, and a second surface connecting the leading edge to the trailing edge;
   a first passage interior to said structure body wherein said first passage includes a first opening on one of a radially outward edge and a radially inward edge and a second opening on the other of said radially outward edge and said radially inward edge;
   a second passage interior to said structure body, wherein said second passage is approximately aligned with said first passage, and wherein said second passage is disposed between said first passage and one of said first surface and said second surface, and wherein said second passage insulates said first passage from heat transfer through said one of said first surface and said second surface;
   wherein said first passage is a pass through passage, and further comprising a fourth passage, the fourth passage being connected to at least said second passage via a plenum in one of said radially inner portion and said radially outer portion, and wherein said radially inner portion is a radially inner platform and said radially outer portion is a radially outer platform; and
   wherein said plenum is positioned in said radially inner portion.

10. The gas turbine engine structure of claim 1, wherein said structure body has an airfoil shaped profile normal to a chord line, and wherein the first surface is a pressure surface and the second surface is a suction surface.

11. A gas turbine engine comprising:
a compressor section;
a combustor section fluidly connected to said compressor section via a flow path;
a turbine section fluidly connected to the combustor section via said flow path;
at least one gas turbine engine structure extending radially through said flow path and comprising a structure body spanning a radially inner portion and a radially outer portion, the structure body having an upstream edge, a downstream edge, a first surface connecting the upstream edge to the downstream edge, and a second surface connecting the upstream edge to the downstream edge;
said at least one gas turbine engine structure including a pass through passage having a fluid inlet on one of a radially outward side of said flow path and a radially inward side of said flow path and an outlet on the other of said radially outward side of said flow path and said radially inward side of said flow path; and
a first cooling passage interior to said structure body, wherein said first cooling passage is approximately aligned with said pass through passage, and wherein said first cooling passage is disposed between said pass through passage and one of said first surface and said second surface, and wherein said first cooling passage insulates said pass through passage from heat transfer through said one of said first surface and said second surface.

12. The gas turbine engine of claim 11, further comprising a second cooling passage interior to said structure body, wherein said second cooling passage is approximately aligned with said pass through passage, and wherein said second cooling passage is disposed between said pass through passage and the other of said first surface and said second surface, and wherein said second cooling passage insulates said pass through passage from heat transfer through said other of said first surface and said second surface.

13. The gas turbine engine of claim 11, wherein said first cooling passage includes a plurality of holes connecting said cooling passage to said one of said first surface and said second surface, such that said first cooling passage is operable to film cool said structure body.

14. The gas turbine engine of claim 11, wherein said first cooling passage is operable to convectively cool said one of said first surface and said second surface.

15. A gas turbine engine comprising:
a compressor section;
a combustor section fluidly connected to said compressor section via a flow path;
a turbine section fluidly connected to the combustor section via said flow path;
at least one gas turbine engine structure extending radially through said flow path and comprising a structure body spanning a radially inner portion and a radially outer portion, the structure body having an upstream edge, a downstream edge, a first surface connecting the upstream edge to the downstream edge, and a second surface connecting the upstream edge to the downstream edge;
said at least one gas turbine engine structure including a pass through passage having a fluid inlet on one of a radially outward side of said flow path and a radially inward side of said flow path and an outlet on the other of said radially outward side of said flow path and said radially inward side of said flow path; and
a first cooling passage interior to said structure body, wherein said first cooling passage is approximately aligned with said pass through passage, and wherein said first cooling passage is disposed between said pass through passage and one of said first surface and said second surface, and wherein said first cooling passage insulates said pass through passage from heat transfer through said one of said first surface and said second surface; and
wherein said first cooling passage includes an outlet connected to one of said radially inner portion and said radially outer portion, such that at least a portion of fluid flowing through said first cooling passage is operable to cool said one of said radially inner portion and said radially outer portion, and wherein said radially outer portion is a radially outer platform and wherein said radially inner portion is a radially inner platform.

16. The gas turbine engine of claim 11, wherein an inlet of said first cooling passage is connected to an outlet of said pass through passage via a plenum in one of said radially inner portion and said radially outer portion such that a portion of a fluid passing through said pass through passage is provided to said first cooling channel as a coolant.

17. The gas turbine engine of claim 16, wherein said plenum is defined partially by a void in said one of said radially inner portion and said radially outer portion and partially by an adjacent gas turbine engine component.

18. The gas turbine engine of claim 11, wherein said at least one gas turbine engine structure including further includes a serpentine coolant passage operable to provide coolant from a source outside said gas turbine engine structure to at least said first cooling passage.

19. A method for passing a fluid through a flow path in a gas turbine engine comprising:
passing a fluid through a pass through passage in an engine structure, the pass through passage having a fluid inlet on one of a radially outward side of said flow path and a radially inward side of said flow path and an outlet on the other of said radially outward side of said flow path and said radially inward side of said flow path; and
insulating said pass through passage from heat in said flow path using at least one cooling passage disposed between said pass through passage and at least one of a first surface and a second surface of said static structure.

20. A method for passing a fluid through a flow path in a gas turbine engine comprising:
passing a fluid through a pass through passage in an engine structure, the pass through passage having a fluid inlet on one of a radially outward side of said flow path and a radially inward side of said flow path and an outlet on the other of said radially outward side of said flow path and said radially inward side of said flow path;
insulating said pass through passage from heat in said flow path using at least one cooling passage disposed between said pass through passage and at least one of a first surface and a second surface of said static structure; and
providing coolant from said cooling passage to at least one of a first platform radially inward of the flow path and a second platform radially outward of the flow path, thereby providing cooling to said at least one of said platforms.

21. The gas turbine engine structure of claim 1, wherein the first passage is isolated from the second passage, such that fluid in the first passage is not intermixed with fluid in the second passage.

22. The gas turbine engine structure of claim 1, wherein the first passage is a pass through passage.

* * * * *